(12) United States Patent
Okamatsu et al.

(10) Patent No.: US 12,434,513 B2
(45) Date of Patent: Oct. 7, 2025

(54) RUBBER MEMBER, TIRE, AND METHOD OF MANUFACTURING RUBBER MEMBER

(71) Applicants: The Yokohama Rubber Co., LTD., Tokyo (JP); Chitose Institute of Science and Technology, Chitose (JP); National University Corporation Hokkaido University, Sapporo (JP); Tohoku Techno Arch Co., Ltd., Sendai (JP)

(72) Inventors: Takahiro Okamatsu, Hiratsuka (JP); Masatsugu Shimomura, Chitose (JP); Yuji Hirai, Chitose (JP); Yasutaka Matsuo, Sapporo (JP); Toshihiko Arita, Sendai (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 168 days.

(21) Appl. No.: 18/113,006

(22) Filed: Feb. 22, 2023

(65) Prior Publication Data

US 2023/0191852 A1 Jun. 22, 2023

Related U.S. Application Data

(62) Division of application No. 17/374,854, filed on Jul. 13, 2021, now abandoned, which is a division of
(Continued)

(30) Foreign Application Priority Data

May 2, 2016 (JP) .................................. 2016-092388

(51) Int. Cl.
*B60C 13/00* (2006.01)
*B29C 59/02* (2006.01)
(Continued)

(52) U.S. Cl.
CPC ............ *B60C 13/001* (2013.01); *B29C 59/02* (2013.01); *B29D 30/72* (2013.01); *B60C 1/00* (2013.01);
(Continued)

(58) Field of Classification Search
None
See application file for complete search history.

(56) References Cited

U.S. PATENT DOCUMENTS 7,204,284 B2    4/2007  Paturle et al.
2002/0139164 A1*  10/2002  Ishihara ............. B29D 30/0606
                                              425/46

(Continued)

FOREIGN PATENT DOCUMENTS

CN    102448692    5/2012
JP    S63-302031   12/1988
(Continued)

*Primary Examiner* — Yung-Sheng M Tsui
*Assistant Examiner* — Melody Tsui
(74) *Attorney, Agent, or Firm* — Thorpe North & Western, LLP

(57) ABSTRACT

A method of manufacturing a rubber member includes forming a mask on which pattern structures are arranged at a constant pitch, arranging the mask on a substrate of a mold made of a metal or a semiconductor material and etching the substrate. The method further includes adhering unvulcanized rubber to the substrate, vulcanizing the unvulcanized rubber to form vulcanized rubber, and transferring a fine ridged/grooved structure to a surface of the vulcanized rubber. The fine ridged/grooved structure is formed on at least a part of the surface of the vulcanized rubber as the rubber member, the fine ridged/grooved structure having fine ridged/grooved portions arranged at the constant pitch. A region in which the fine ridged/grooved structure is provided is visually recognizable by a structural color different from colors of other regions.

2 Claims, 2 Drawing Sheets

Related U.S. Application Data application No. 16/098,819, filed as application No. PCT/JP2017/017216 on May 2, 2017, now abandoned.

(51) Int. Cl.

| | | |
|---|---|---|
| *B29D 30/72* | (2006.01) | |
| *B60C 1/00* | (2006.01) | |
| *C08K 3/04* | (2006.01) | |
| *C08K 3/36* | (2006.01) | |
| *C08L 7/00* | (2006.01) | |
| *C08L 9/00* | (2006.01) | |
| *C08L 19/00* | (2006.01) | |

(52) U.S. Cl.
CPC ............ *B60C 1/0025* (2013.01); *B60C 13/00* (2013.01); *C08K 3/04* (2013.01); *C08K 3/36* (2013.01); *C08L 7/00* (2013.01); *C08L 9/00* (2013.01); *C08L 19/00* (2013.01); *B29D 2030/726* (2013.01)

(56) References Cited

U.S. PATENT DOCUMENTS

| | | | |
|---|---|---|---|
| 2004/0187997 A1* | 9/2004 | Paturle | B60C 11/00 264/293 |
| 2009/0218019 A1* | 9/2009 | Paturle | B29C 33/424 428/88 |
| 2012/0043693 A1* | 2/2012 | King | B29C 33/424 264/219 |
| 2017/0050473 A1 | 2/2017 | Muhlhoff et al. | |

FOREIGN PATENT DOCUMENTS

| | | |
|---|---|---|
| JP | 2005-289334 | 10/2005 |
| JP | 2009-192676 | 8/2009 |
| JP | 4925025 | 4/2012 |
| JP | 2012-250575 | 12/2012 |
| JP | 2015-218242 | 12/2015 |
| WO | WO 2007/045425 | 4/2007 |
| WO | WO 2010/096072 | 8/2010 |
| WO | WO 2015/165863 | 11/2015 |
| WO | WO 2017/086363 | 5/2017 |

\* cited by examiner

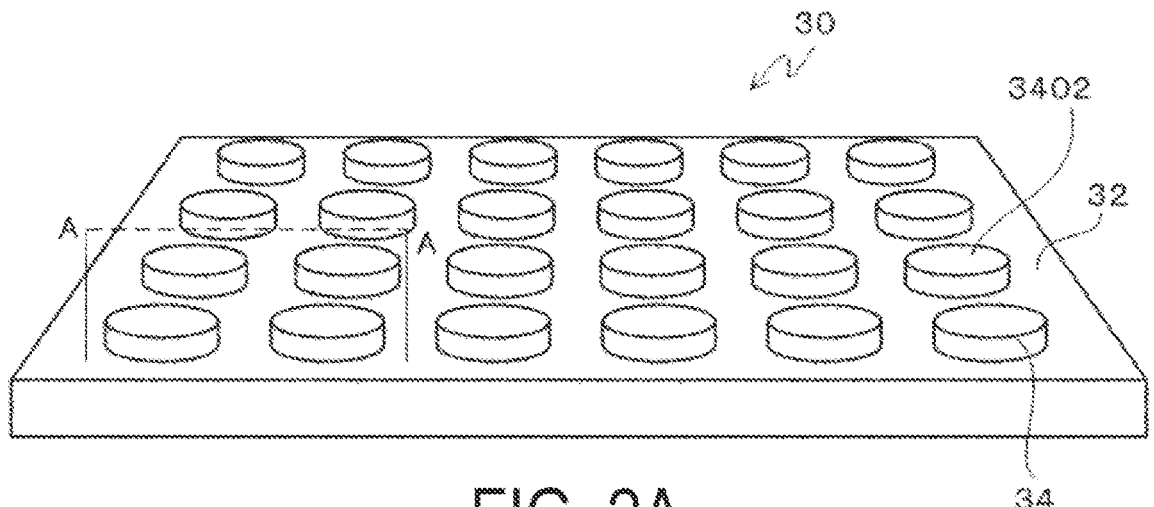
FIG. 2A
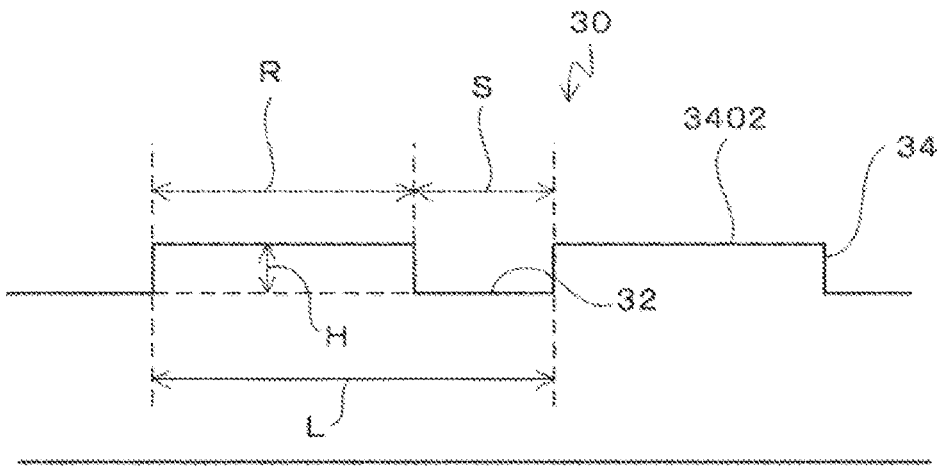
FIG. 2B
| SAMPLE | EXAMPLE 1 | 2 | 3 | COMPARATIVE EXAMPLE 1 | 2 |
|---|---|---|---|---|---|
| METHOD OF COLORING | STRUCTURAL COLOR | STRUCTURAL COLOR | STRUCTURAL COLOR | STRUCTURAL COLOR | PAINT |
| RIDGE/GROOVE HEIGHT (nm) | 250 | 449 | 621 | 680 | |
| PRODUCED COLOR | BLUE AND YELLOW | YELLOW AND GREEN | RED | NONE | RED |
| DURABILITY TEST RESULTS | PASS | PASS | PASS | PASS | FAIL |
FIG. 3

RUBBER MEMBER, TIRE, AND METHOD OF MANUFACTURING RUBBER MEMBER

RELATED APPLICATIONS

This application is a divisional of U.S. patent application Ser. No. 17/374,854, filed on Jul. 13, 2021, which is a divisional of U.S. patent application Ser. No. 16/098,819, filed on Nov. 2, 2018, which is the National Stage of International Patent Application No. PCT/JP2017/017216, filed on May 2, 2017, which claims the benefit of priority from Japan Patent Application No. 2016-092388, filed on May 2, 2016.

TECHNICAL FIELD

The present technology relates to a rubber member, and a tire, which have a region that produce a color via a structural color, and a method of manufacturing the rubber member.

BACKGROUND ART

In the related art, to impart information such as alphanumerics and marks to the surface of a rubber product such as a tire, ink has been deposited to the rubber surface by means of an inkjet printer, to print the information thereon.

Alternatively, a structure color produced by a fine structure that is equal to or smaller than a light wavelength has been known and applied to various fields.

For example, Japan Unexamined Patent Publication No. 2009-192676 discloses a color filter that produces structural colors. Japan Patent No. 4925025 discloses the technique of calculating a distortion of an object by measuring a change in produced structural colors (wavelength change). In Japan Unexamined Patent Publication No. 2009-192676, the fine structure that produces the structural colors is formed by stamping, and in Japan Patent No. 4925025, the structural color is produced by periodically arranging microparticles on the surface of an elastic body.

In a case where information is printed on a tire by the use of an inkjet printer as in the above-described related art, the ink is gradually peeled off from the rubber surface due to expansion and contraction (deflection) of the rubber during driving. Thus, it is difficult to maintain the printed information to be visually recognizable for an extended period of time.

As described above, the structural color has been applied to various field. However, the method of forming the fine structure that produces the structural color by stamping and the method of laminating a plurality of layers to produce the structural color, as described in Japan Unexamined Patent Publication No. 2009-192676, are applied to products having a thin-film structure, such as a color filter. Additionally, such methods often serve to produce the structural color by utilizing transmitted light (diffracted light) and therefore, cannot be directly applied to a less transparent rubber member such as a tire.

Further, the method of arranging microparticles to produce the structural color as described in Japan Patent No. 4925025 cannot be easily applied to members requiring heating that may cause deformation of the members, such as vulcanization in the tire manufacturing process.

SUMMARY

The present technology imparts information that will be visually recognizable for an extended period of time on the surface of the rubber member.

A rubber member according to the technology includes a fine ridged/grooved structure on at least a part of the surface of the rubber member, the fine ridged/grooved structure formed via transfer from a mold and having fine ridged/grooved portions arranged at a constant arrangement pitch; a region in which the fine ridged/grooved structure is provided is visually recognizable by a different structural color from the colors of other regions.

In the rubber member according to a further aspect of the technology, the arrangement pitch or ridge/groove height of the fine ridged/grooved portions is determined based on a wavelength of visible light, the wavelength corresponding to the color visually recognizable as the structural color.

In the rubber member according to a further aspect of the technology, the arrangement pitch or ridge/groove height of the fine ridged/grooved portions is equal to or smaller than 650 nm.

A tire is made of a rubber member according to a further aspect of the technology.

In the tire, the fine ridged/grooved structure is formed on a sidewall portion, and the region in which the fine ridged/grooved structure is provided is formed in a shape to display predetermined information.

In the tire, the sidewall portion contains a diene rubber, a carbon black, and a silica, the diene rubber contains from 30 to 70 mass % of natural rubber and/or isoprene rubber, a nitrogen adsorption specific surface area of the carbon black is from 20 to 60 $m^2/g$, a content of the carbon black is from 5 to 45 parts by mass per 100 parts by mass of the diene rubber, a content of the silica is from 15 to 55 parts by mass per 100 parts by mass of the diene rubber, and a total content of the carbon black and the silica is from 30 to 60 parts by mass per 100 parts by mass of the diene rubber.

A method of manufacturing a rubber member according to the technology includes: forming a mask on which pattern structures are arranged at the constant pitch; arranging the mask on a substrate made of a metal or a semiconductor material and etching the substrate; and adhering unvulcanized rubber to the substrate, vulcanizing the unvulcanized rubber, and transferring the fine ridged/grooved structure to the surface of the vulcanized rubber.

The method of manufacturing the rubber member according to a further aspect of the technology further includes determining the arrangement pitch of the fine ridged/grooved portions based on a wavelength of visible light, the wavelength corresponding to the color visually recognizable as the structural color, and in the forming the mask, the pitch of the pattern structures is determined based on the arrangement pitch determined in the determining the arrangement pitch.

The method of manufacturing the rubber member according to a further aspect of the technology further includes determining the ridge/groove height of the fine ridged/grooved portions based on a wavelength of visible light, the wavelength corresponding to the color visually recognizable as the structural color, and in the etching, an etching time of the substrate is appropriately controlled to match the ridge/groove height of the ridged/grooved portions with the ridge/groove height determined in the determining the ridge/groove height.

According to the technology, in at least a part of the rubber member, a structural color exhibits a color that is different from the colors of other regions. Thus, the durability of an indicator on the rubber surface is advantageously improved compared to a case where the indicator is drawn using ink or the like.

According to the technology, information may be indicated in any color on the surface of the rubber member by appropriately modifying the arrangement pitch or ridge/groove height of the fine ridged/grooved portions.

According to the technology, information may be displayed in any color including red.

According to the technology, information may be indicated in the structural color on the tire surface. Thus, the indicator is advantageously employed with high durability against wear caused by the use of the tire.

According to the technology, information may be advantageously indicated in the structural color with high durability on the sidewall portion. The sidewall portion is easily visually recognizable in the tire from outside and has conventionally been used to indicate various information about the tire.

According to the technology, information may be advantageously indicated in the structural color on the surface of rubber having high resistance to deformation, which is suitable for the sidewall portion.

According to the technology, in at least a part of the rubber member, a region can be formed, in which a structural color exhibits a color that is different from the colors of other regions. Thus, the durability of the indicator on the rubber surface is advantageously improved compared to a case where the indicator is drawn using ink or the like.

According to the technology, the arrangement pitch of the fine ridged/grooved portions may be advantageously set to any dimension.

According to the technology, the ridge/groove height of the fine ridged/grooved portions may be advantageously set to any dimension.

BRIEF DESCRIPTION OF DRAWINGS

FIGS. 2A and 2B are partial enlarged views of a logo mark 204.

FIG. 3 is a table showing the results of the durability test on the present technology and the conventional art.

DETAILED DESCRIPTION

Figure 1:
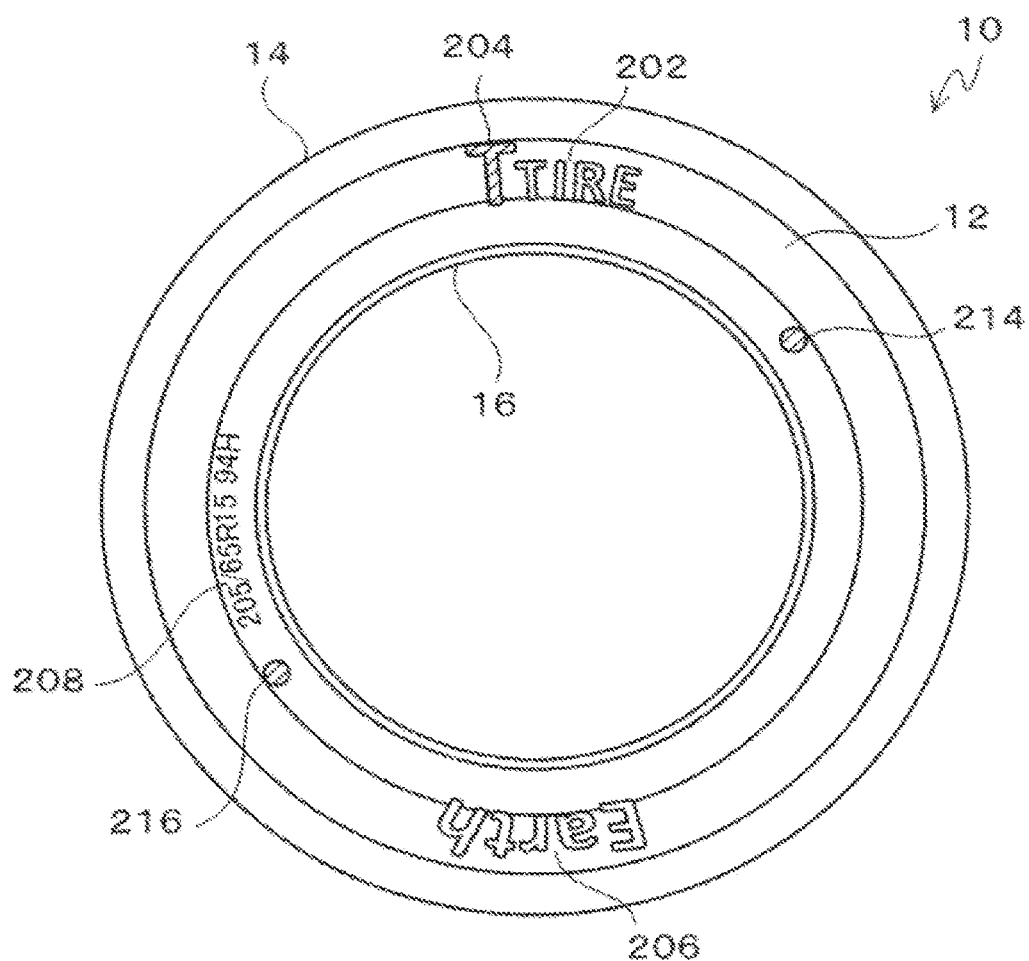
FIG. 1 is a side view illustrating a vehicle tire 10 according to an embodiment.

A rubber member, a tire, and a method of manufacturing the rubber member according to a preferred embodiment of the present technology are described in detail below with reference to accompanying drawings.

In the present embodiment, an example of application of the rubber member according to the present technology to a vehicle tire is described.

FIG. 1 is a side view illustrating a vehicle tire 10 according to the embodiment of the technology.

The vehicle tire 10 includes a tread portion 14 having a tread surface that makes a contact with a road surface, a bead portion 16 engaged with a wheel (not illustrated), and a sidewall portion 12 that connects the tread portion 14 to the bead portion 16 and constitutes a tire side surface.

In the tread portion 14, wear resistance is important, while in the sidewall portion 12, the resistance to deformation caused by loads during driving is important. Thus, the composition in the sidewall portion 12 is different from that of the tread portion 14.

Describing in more detail, in the present embodiment, the sidewall portion 12 contains a diene rubber, a carbon black, and a silica, the diene rubber contains from 30 to 70 mass % of natural rubber and/or isoprene rubber, a nitrogen adsorption specific surface area of the carbon black is from 20 to 60 $m^2/g$, a content of the carbon black is from 5 to 45 parts by mass per 100 parts by mass of the diene rubber, a content of the silica is from 15 to 55 parts by mass per 100 parts by mass of the diene rubber, and a total content of carbon black and silica is from 30 to 60 parts by mass per 100 parts by mass of the diene rubber.

Various information is indicated on the sidewall portion 12.

Examples of the information indicated on the sidewall portion 12 include a manufacturer name 202 of the vehicle tire 10, a logo mark 204, a tire brand name 206, a tire dimension 208, a uniformity mark 214, and a light point mark 216. Examples of the information also include a tire serial number and a rotation direction.

Among the above-described information, the uniformity mark 214 and the light point mark 216 are imparted using ink or the like, after the completion (vulcanization) and inspection of individual tires.

The manufacturer name 202, the manufacturer logo mark 204, the tire brand name 206, and the tire dimension 208 are imparted by transferring ridges/grooves formed on a mold during vulcanization of the vehicle tire 10.

The information transferred from the ridges/grooves of the mold, other than the logo mark 204, has the same color as the whole vehicle tire 10, and is visually recognizable by the ridges/grooves on the surface of the sidewall portion 12.

In contrast, the logo mark 204 is in a different color such as the manufacturer's corporate color, and visually recognizable from the color of the vehicle tire 10.

FIG. 2 are partial enlarged views of the logo mark 204. FIG. 2A is a perspective view, and FIG. 2B is a cross-sectional view taken along A-A.

A fine ridged/grooved structure 30 is provided on the entire region of the logo mark 204.

The fine ridged/grooved structure 30 is configured such that fine ridged/grooved portions 34 are arranged on a tire surface 32 at a constant arrangement pitch. The region in which the fine ridged/grooved structure 30 is provided is visually recognizable due to a different structural color from other regions.

The fine ridged/grooved portions described herein refer to various known structures used to produce the structural color, such as protrusions and holes. In the present embodiment, they are fine projections protruding from the tire surface 32 that is a curved surface (or a flat surface).

The arrangement pitch described in the present embodiment refers to a distance between centers of adjacent fine projections, that is, pitch. As represented by a sign L in FIG. 2B, the pitch corresponds to a total length of each one of the projections and each one of the recessed portions along the surface of the rubber member (tire).

The constant arrangement pitch described herein refers to various known pitches used to produce the structural color, and may be a constant value over the entire fine ridged/grooved structure 30, or may vary continuously or gradually.

The arrangement pitch or the ridge/groove height of the fine ridged/grooved portions 34 is determined based on a wavelength of visible light, which corresponds to the color visually recognizable as the structural color. In other words, the wavelength corresponding to the color to be exhibited as the structural color is selected from a wavelength range of the visible light, and a specific dimension of the arrangement pitch or the ridge/groove height of the fine ridged/grooved portions 34 is determined according to the principle of resonance grating.

In the present embodiment, the arrangement pitch or the ridge/groove height of the fine ridged/grooved portions 34 is set to be equal to or smaller than 650 nm, for example. This is because the experiments conducted by the present inventors demonstrated that the structural color is recognizable for the fine ridged/grooved structure 30 having the arrangement pitch or the ridge/groove height of 650 nm or less.

In the present embodiment, the fine ridged/grooved portions 34 include a cylinder extending perpendicularly to the tire surface 32. A top surface 3402 of the cylinder is a perfect circle, the diameter R of which is about 5 μm. A distance S between the adjacent cylinders is 1 μm, and the arrangement pitch is about 6 μm. For the sake of convenience, FIG. 2 do not illustrate the elements in actual ratio.

Here, the present inventors made a plurality of rubber members, wherein a height (ridge/groove height) H of each of the fine ridged/grooved portions 34 from the tire surface 32 is different for each of the tires, while the arrangement pitch of the fine ridged/grooved portions 34 as well as the diameter of the cylindrical fine ridged/grooved portions 34 are fixed to the constant values. As a result, following structural colors were visually recognized in decreasing order of recognizable area. The reason why a plurality of colors are visually recognized is that the structural color varies depending on a viewing angle.

Ridge/groove height of 650 nm: red, magenta
Ridge/groove height of 607 nm: magenta, red, orange
Ridge/groove height of 577 nm: magenta, orange
Ridge/groove height of 536 nm: orange, magenta
Ridge/groove height of 500 nm: yellow, green, orange As the ridge/groove height was smaller, the color became more bluish.

In this manner, information may be indicated in any color on the rubber surface by adjusting the arrangement pitch or the ridge/groove height of the fine ridged/grooved portions 34. For example, to indicate the logo mark 204 in red, the ridge/groove height may be set to about 650 nm.

Next, a method of manufacturing the rubber member producing the structural color will be explained.

The below-described method of manufacturing the rubber member includes a step of forming a mold having fine pattern structures (step 1 and step 2: mold forming step) and a step of adhering unvulcanized rubber to the mold, vulcanizing the unvulcanized rubber, and transferring a fine ridged/grooved structure to the rubber surface (step 3: transferring step).

Prior to the following steps, the color of the structural color to be formed on the rubber member is determined, and the arrangement pitch or the ridge/groove height of the fine ridged/grooved portions is determined based on the wavelength of visible light, which corresponds to the determined color (color visually recognizable as the structural color on the rubber member) (an arrangement pitch determining step or a ridge/groove determining step).

(Step 1) A mask on which pattern structures are arranged at a constant pitch is formed to form the fine ridged/grooved structure 30 on the rubber surface (mask forming step).

First, a chromium (Cr) film of about 80 nm is formed on a mask forming substrate (silicon substrate) using a sputtering device. Next, a positive-type electron beam resist is coated on the chromium film by spin-coating (3 seconds at 300 rpm followed by 60 seconds at 4000 rpm). Then, the substrate coated with the electron beam resist is pre-baked for 3 minutes on a hot plate at 150° C., and is subjected to exposure and patterning by an electron beam lithographic device. After that, the substrate is immersed in a developing solution for 60 seconds to be developed. In a case where the arrangement pitch of the fine ridged/grooved portions is determined based on the wavelength of visible light corresponding to the color visually recognized as the structural color, that is, the arrangement pitch of the fine ridged/grooved portions is used as a parameter for determining the structural color being produced, the arrangement pitch of the pattern structures in the patterning is determined based on the arrangement pitch determined in the arrangement pitch determining step. After development, the substrate is immersed in a mixed-acid chromium etching solution for about 60 seconds to selectively dissolve off the exposed Cr, thereby making a mask (photo mask).

(Step 2) A mask is placed on a substrate made of a metal or semiconductor material, and the substrate is etched (etching step).

In the present embodiment, a single-crystal silicon substrate is used as the above-mentioned substrate. The substrate is cleaned with ultrasonic cleaning for 5 minutes in acetone and methanol in this order, and a positive photoresist is coated on the substrate by spin-coating (3 seconds at 300 rpm and then, 60 seconds at 5000 rpm). Next, the spin-coated substrate is pre-baked on a hot plate at 95° C. for 90 seconds. The pre-baking evaporates off an organic solvent present in the resist and thus can improve the resist adhesion to the substrate. Subsequently, the substrate coated with the photoresist is exposed using a mask aligner and the photo mask manufactured in the step 1, and is immersed in a developing solution to dissolve off the exposed section for patterning.

After patterning, the substrate is etched using a dry etching device (passivation gas: $C_4F_8$, 80 sccm, etching gas: $SF_6$, 130 sccm, Bosch process) to manufacture a mold (silicon mold). In a case where the ridge/groove height of the fine ridged/grooved portions is determined based on the wavelength of visible light corresponding to the color visually recognizable as the structural color, that is, the ridge/groove height of the fine ridged/grooved portions is used as a parameter for determining the reproduction of the structural color, the ridge/groove height of the ridge/groove portions can be matched with the ridge/groove height determined in the ridge/groove height determining step by appropriately controlling an etching time of the substrate.

In the above-mentioned step 1 and step 2 (mold forming step), the mold having the fine ridged/grooved structure is manufactured by photolithography. However, the method of manufacturing the rubber member according to the present technology is not limited to this, and may be various known methods.

(Step 3) Unvulcanized rubber was adhered to the etched substrate (mold), the unvulcanized rubber is vulcanized, and the fine ridged/grooved structure is transferred to the rubber surface (transferring step).

Unvulcanized rubber is placed on a silicon mold, is softened at 80° C. for 10 minutes and then, is pressed and vulcanized at 160° C. for 10 minutes.

After vulcanization, the vulcanized rubber is peeled off from the silicon mold, and the transfer of the fine ridged/grooved structure to the rubber surface is confirmed. The region in which the fine ridged/grooved structure is formed is visually recognizable due to being colored differently from the other regions (flat regions) on the rubber surface, that is, the structural color of the fine ridged/grooved structure.

A durability test is performed on the logo mark 204 thus formed in the structural color, and a logo mark printed using an inkjet printer according to the conventional art. Specifically, surfaces (rubber surfaces) of the logo marks thus formed are rubbed 100 times with a cotton cloth, and the surface state and color change are visually observed.

FIG. 3 shows results of the durability test. The table in FIG. 3 shows a sample number, a color producing method, a ridge/groove height, a visually recognized color (color production), and a durability test result. In columns of the durability test results, an unchanged sample in terms of the surface state and color is designated as "Pass", and a decolorized sample is designated as "Fail".

As illustrated in FIG. 3, after the durability test, the logo mark printed using the inkjet printer (Comparative Example 2) can not be visually recognized due to peeling off of the ink, while there is no change in visual state of the logo marks formed in structural colors (Examples 1 to 3 and Comparative Example 1).

In Comparative Example 1, among the logo marks formed in the structural color, the ridge/groove height of the logo mark is 680 nm, which is out of range for producing the structural color described above (equal to or smaller than 650 nm). Thus, no color is produced.

As has been described, in the vehicle tire 10 according to the embodiment, at least a part of the rubber member is indicated in the different structural color from the colors of other regions, which advantageously improves the durability of indication on the rubber surface compared to the drawing in ink or the like.

In addition, information may be displayed in any color on the surface of the rubber member by appropriately changing the arrangement pitch or the ridge/groove height of the fine ridged/grooved portions 34.

In the present embodiment, the fine ridged/grooved portions 34 include a cylindrical projection. However, no such limitation is intended, and the fine ridged/grooved portions may have various known shapes, which are capable of producing the structural color. For example, the fine ridged/grooved portions 34 may include a conical projection or a grid-like projection. Additionally, the fine ridged/grooved structure 30 may include a hole or a grid-like groove formed on the rubber surface. Also in this case, the holes may be cylindrical or conical, and furthermore, microparticles or the like may be arranged on the bottom portion of the conical hole (apex of the cone).

In the present embodiment, the example of the rubber member according to the present technology applied to the vehicle tire is described. However, no such limitation is intended, and the rubber member according to the present technology is suitable as various known rubber members, in particular, any member vulcanized in a manufacturing process.

In the present embodiment, only the logo mark 204 is indicated in the structural color. However, no such limitation is intended, and other information displayed on the sidewall portion 12 of the vehicle tire 10 may be also indicated in the structural color. The fine ridged/grooved structure 30 may be formed on the entire rubber member, such that the entire rubber member is visually recognizable in the structural color.

In the present embodiment, the present technology is applied to information indicated on the sidewall portion 12 of the vehicle tire 10. However, no such limitation is intended, and the present technology may be applied to information indicated on other portions of the vehicle tire 10.

The invention claimed is:

1. A method of manufacturing the rubber member, said rubber member being comprised of a ridged or grooved structure on at least a part of a surface of the rubber member, and having ridged or grooved portions arranged at a constant arrangement pitch, each of the ridged or grooved portions having a same length and width when viewed in plan view, a region in which the ridged or grooved structure is provided being visually recognizable by a structural color different from colors of other regions, the method comprising:

forming a mask having a pattern structure of the ridged or grooved portions arranged at the constant arrangement pitch and, in the forming the mask, determining the pitch of the pattern structures of the ridged or grooved portions based on determining the arrangement pitch of the ridged or grooved portions which is based on a wavelength of visible light, the wavelength corresponding to the color visually recognizable as the structural color;

arranging the mask on a substrate made of a metal or a semiconductor material and etching the substrate to form the ridged or grooved structure on the substrate;

adhering unvulcanized rubber to the substrate after the etching, vulcanizing the unvulcanized rubber to form vulcanized rubber, and transferring the ridged or grooved structure to a surface of the vulcanized rubber to obtain the rubber member, the rubber member being part of a tire.

2. The method of manufacturing the rubber member according to claim 1, wherein the arrangement pitch or ridged or grooved height of the ridged or grooved portions is equal to or smaller than 650 nm.

* * * * *